(12) United States Patent
Kunieda

(10) Patent No.: US 8,670,169 B2
(45) Date of Patent: Mar. 11, 2014

(54) IMAGE PROCESSING APPARATUS AND IMAGE PROCESSING METHOD FOR SELECTING AN IMAGE FOR MONOCHROMATIC OUTPUT

(75) Inventor: Hiroyasu Kunieda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 12/552,820

(22) Filed: Sep. 2, 2009

(65) Prior Publication Data

US 2010/0067027 A1 Mar. 18, 2010

(30) Foreign Application Priority Data

Sep. 17, 2008 (JP) .................................. 2008-238299

(51) Int. Cl.
G03F 3/08 (2006.01)
(52) U.S. Cl.
USPC ............. 358/522; 358/1.9; 358/518; 358/527
(58) Field of Classification Search
USPC ........................................................ 358/1.9
See application file for complete search history.

(56) References Cited

U.S. PATENT DOCUMENTS

| | | | |
|---|---|---|---|
| 6,556,210 B1 | 4/2003 | Yamamoto et al. | |
| 6,927,874 B1 | 8/2005 | Enokida et al. | |
| 8,040,551 B2 | 10/2011 | Ono et al. | |
| 2005/0243347 A1* | 11/2005 | Hayaishi | ........................ 358/1.9 |
| 2006/0092292 A1* | 5/2006 | Matsuoka et al. | ........ 348/231.99 |
| 2007/0071314 A1* | 3/2007 | Bhatti et al. | ................... 382/162 |
| 2007/0236729 A1* | 10/2007 | Yoda | ............................ 358/1.15 |

FOREIGN PATENT DOCUMENTS

| | | |
|---|---|---|
| JP | 5-284372 A | 10/1993 |
| JP | 9-146721 | 6/1997 |
| JP | 11-341264 | 12/1999 |
| JP | 2000-295453 | 10/2000 |
| JP | 2000-298722 | 10/2000 |
| JP | 2000-306083 | 11/2000 |
| JP | 2001-251496 | 9/2001 |
| JP | 2003-69828 A | 3/2003 |
| JP | 2004-038661 | 2/2004 |
| JP | 2005-100120 | 4/2005 |
| JP | 2006-115406 A | 4/2006 |
| JP | 2007-116658 | 5/2007 |
| JP | 2007164249 A | 6/2007 |
| JP | 2007-328520 | 12/2007 |
| JP | 2007-328520 A | 12/2007 |
| JP | 2007328520 A | * 12/2007 |
| JP | 2008072524 A | 3/2008 |

* cited by examiner

Primary Examiner — Firmin Backer
Assistant Examiner — Christopher D Wait
(74) Attorney, Agent, or Firm — Fitzpatrick, Cella, Harper & Scinto

(57) ABSTRACT

An image processing apparatus and an image processing method are provided which are capable of selecting an image to be printed in a user's intended color. The image processing apparatus of the present invention includes: a selecting condition setting unit configured to prepare an image selecting condition depending on set output color in printing; a selection DB specifying unit configured to specify a group of images for image selection based on the image selecting condition; and further an image selecting unit configured to select an image from the specified group of images based on the image selecting condition.

15 Claims, 8 Drawing Sheets

IMAGE PROCESSING APPARATUS AND IMAGE PROCESSING METHOD FOR SELECTING AN IMAGE FOR MONOCHROMATIC OUTPUT

BACKGROUND OF THE INVENTION

1. Field of the Invention

The present invention relates to an image processing apparatus and an image processing method for selecting an image from a group of images.

2. Description of the Related Art

In recent years, memories and hard disks with increased capacity have made it possible to store therein a large number of images. As a result, a large number of images can be stored in memories and/or hard disks in printers, multifunction devices, and personal computers, which may impose a great burden on users to select an image that satisfies an output condition from a large number of images. For this reason, there is a need for a technique of selecting an image suitable for output from a large number of images.

Japanese Patent Laid-Open No. 2007-164249 discloses a technique of selecting an output recommended image automatically from multiple images. The output recommended images are those excluding failed images such as backlit and out-of-focus ones. Images are evaluated for predetermined items such as blurring, out-of-focus, and poor exposure, and then low-evaluated images are categorized as failed images. Users can change output settings based on output recommended images and perform an output operation.

Meanwhile, Japanese Patent Laid-Open No. 2008-072524 discloses a technique of determining output suitability based on the size of images. If determined not suitable for output, a warning is displayed on the monitor to inform users.

These image selection techniques make it easy to select an image suitable for output from a large number of images.

However, the image selection methods disclosed in Japanese Patent Laid-Open Nos. 2007-164249 and 2008-072524 do not take into account output color to select an image, which may result in a user's unintended output.

For example, "photo-book" services are becoming popular in which a user's original photo albums can be made based on images taken using a digital camera. Since design is one of the important factors that affect the quality of photo-books, a user is required to select an image that satisfies conditions specified in prepared layouts. High-quality photo-books can thus be achieved by arranging images as specified in each layout.

If output color is specified in each layout, no image suitable for the user's intended output color may be selected because the above-described image selection methods do not take into account output color.

Also, if images are converted into different output color, beginners will have a heavy workload and therefore take a lot of time to determine if the converted images are suitable for output.

It is an object of the present invention to provide an image processing apparatus and an image processing method capable of selecting an image to be output in the user's intended color.

SUMMARY OF THE INVENTION

The present invention is directed to an image processing apparatus including: a determining unit configured to determine an image selecting condition from set output color; a specifying unit configured to specify a group of images for image selection based on the image selecting condition; and a selecting unit configured to select an image from the specified group of images based on the image selecting condition.

The present invention is also directed to an image processing method including: a determining step of determining an image selecting condition from set output color; a specifying step of specifying a group of images for image selection based on the image selecting condition; and a selecting step of selecting an image from the specified group of images based on the image selecting condition.

In accordance with the present invention, since an image is selected from a predetermined group of images based on an image selecting condition suitable for output color, it is possible to select an image to be output in the user's intended color.

Further features of the present invention will become apparent from the following description of exemplary embodiments (with reference to the attached drawings).

DESCRIPTION OF THE EMBODIMENTS

Figure 1:
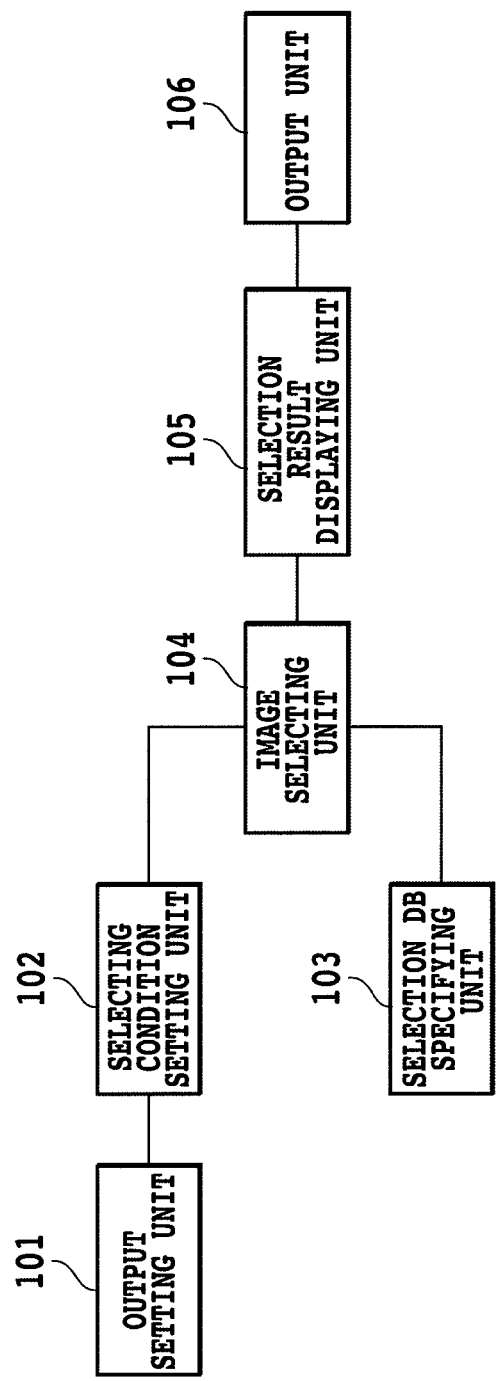
FIG. 1 is a system configuration diagram of an image processing apparatus according to an embodiment of the present invention.

Embodiments of the present invention will hereinafter be described in detail with reference to the accompanying drawings. Components having the same function are designated by the same reference numerals in the drawings described below, and overlapping descriptions thereof will be omitted.

First Embodiment

FIG. 1 is a schematic block diagram showing the configuration of an image processing apparatus according to a first embodiment of the present invention. Herein, for the sake of descriptive convenience, the case where the output device (output unit 106 to be described hereinafter) is a printing device such as a printer or a multifunction device will be exemplified. It will be appreciated that other types of output devices may be adopted.

As shown in FIG. 1, the image processing apparatus according to the present embodiment is configured to set an image selecting condition depending on output color from an output unit that forms an image on a recording medium and to select an image based on the set image selecting condition.

Figure 7:
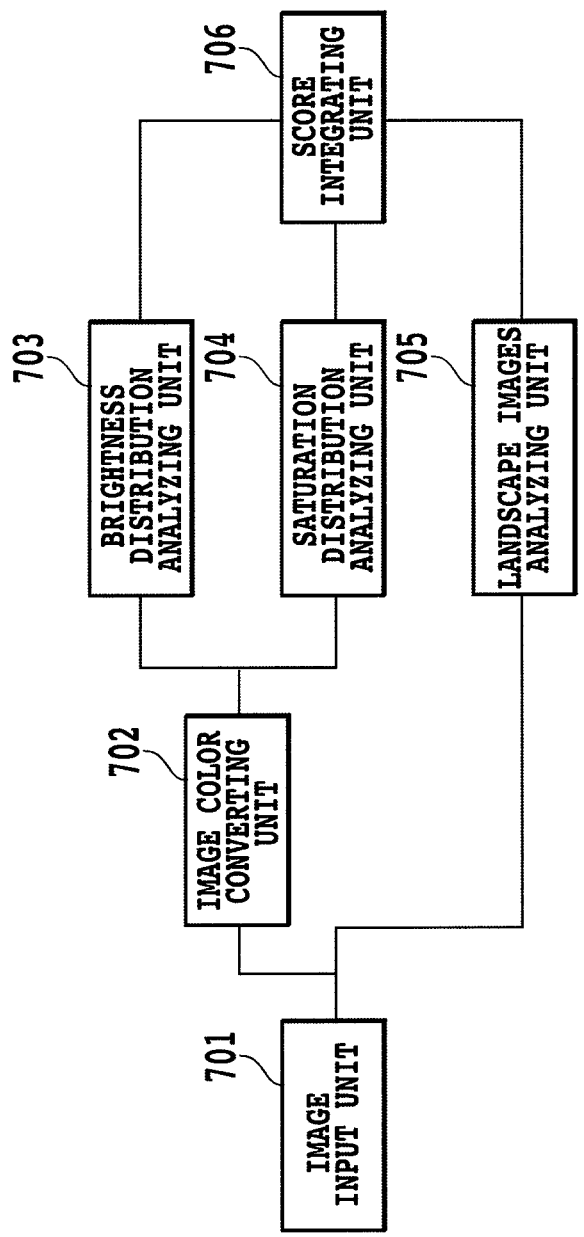
FIG. 7 is a system configuration diagram for image evaluation according to the embodiment of the present invention.

The image processing apparatus according to the present embodiment also includes a control unit (not shown in the drawings) that controls the entire image processing apparatus. The control unit has a CPU for control management, a ROM that stores a control program for the CPU, and a RAM that provides a work area for the CPU. The units shown in FIGS. 1 and 7 are also controlled integrally by the control unit.

The control unit is further coupled with input operation units (not shown in the drawings) including a keyboard, a mouse, and various switches for input of predetermined commands and/or data as well as with a displaying unit that displays various types of information such as input and setting states of the image processing apparatus.

The output setting unit 101 sets image output conditions including output color from the output unit. The details of the setting will be described with reference to FIG. 2.

Figure 2:
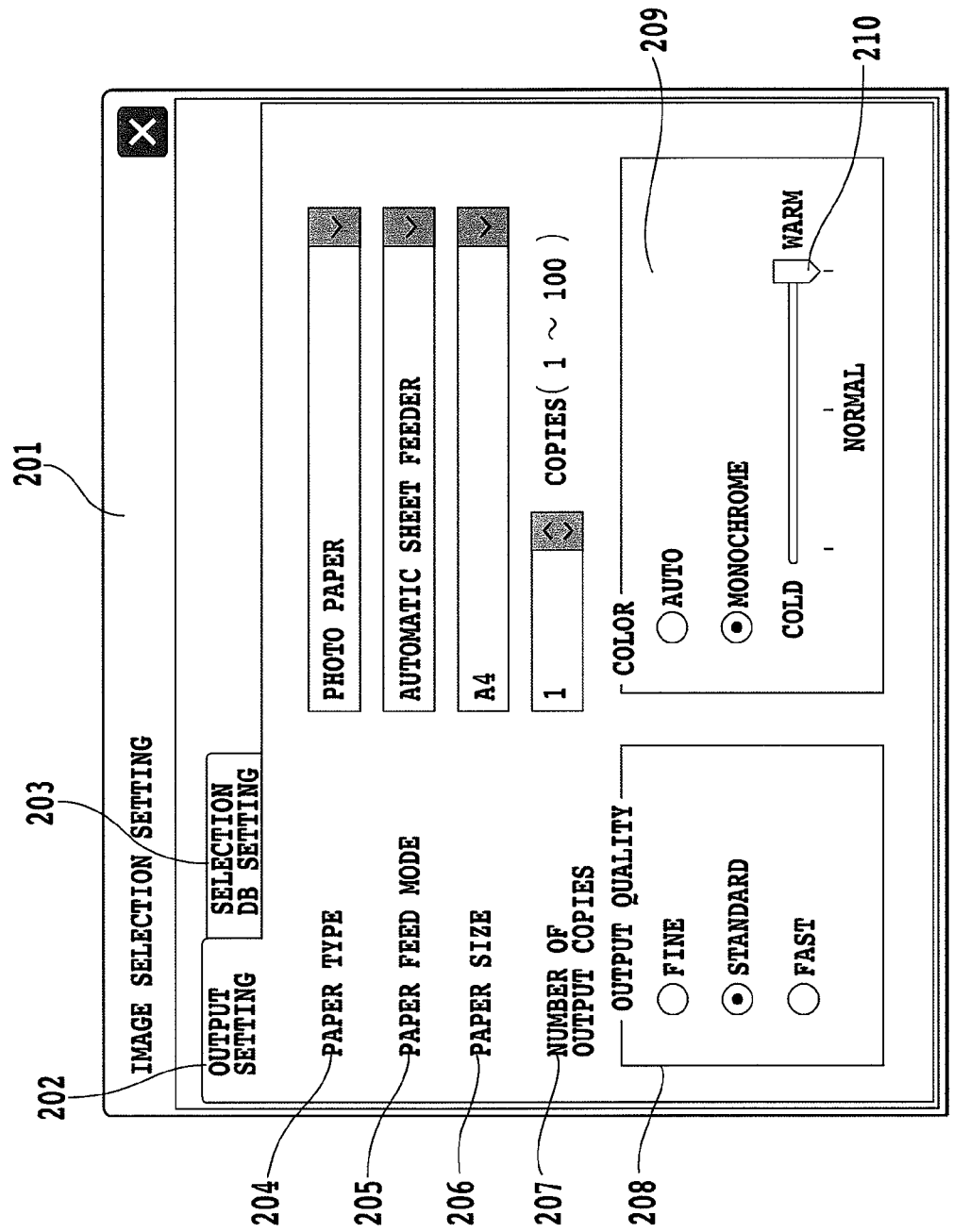
FIG. 2 is a view that illustrates an image selection setting according to the embodiment of the present invention.

FIG. 2 is an exemplary view of a user interface (UI) for output setting to be displayed on the displaying unit.

The reference numeral 201 denotes an output setting window, a UI for item setting on image selection that the present invention proposes. The reference numeral 202 denotes an output setting tab. Output settings such as paper size and type can be made in this output setting tab.

The reference numeral 203 denotes an image selection DB setting tab. A range of image selections from multiple groups of images can be specified in this image selection DB setting tab. Functions included in this tab will be described below. Here will be described the output setting tab 202.

The reference numeral 204 is a setting for paper type, in which paper type to be output from the output unit 106 can be set. The reference numeral 205 is a setting for paper feed mode, in which output paper feed mode can be set.

The reference numeral 206 is a setting for paper size, in which output paper size can be set.

The reference numeral 207 is a setting for the number of output copies.

The reference numeral 208 is a setting for output quality, in which the output quality can be selected from three options: "Fine," "Standard," and "Fast."

The reference numeral 209 is a setting for output color in printing, in which two options are provided: "Auto" and "Monochrome." If "Auto" is selected, the output color is determined automatically in accordance with the color space of selected images. If the output images are colored ones, colored output will be set, while if monochrome ones, monochromatic output will be set.

The reference numeral 210 is a setting for monochromatic output. This setting becomes available if the output color is set to "Monochrome" in the output color setting 209. The monochromatic output can be set to "Normal," "Cold," or "Warm" through a slider on the UI. It will be appreciated that level setting may be made for "Cold" and "Warm."

In the present embodiment, when a user makes a desired setting in the output color setting 209 and/or monochromatic output setting 210 via the input operation units, the output setting unit 101 receives the setting as an input to make a setting for output color (output setting) in the output unit 106.

It is noted that although the present embodiment describes the case where the output color in printing is set arbitrarily by a user, the output color in printing may be preset to a predetermined color (e.g. colored output, particularly colored output, monochromatic output).

Herein, for the sake of descriptive convenience, the items here are set as follows:

| | |
|---|---|
| Paper type | Photo paper |
| Paper feed mode | Automatic sheet feeder |
| Paper size | A4 |
| Number of output copies | 1 |
| Output quality | Standard |
| Color | Monochrome |

The reference numeral 102 denotes a selecting condition setting unit. The selecting condition setting unit 102 sets a condition for image selection (image selecting condition) based on the output setting made in the output setting unit 101. The selecting condition is set depending on output color in the present embodiment, and the output setting is warm-tone monochromatic output.

In the present embodiment, since the setting is "monochromatic output," the image processing apparatus evaluates for "monochromatic value (monochromatic score)" based on the set image selecting condition. Monochromatic value represents a score when an image is output under the set condition. Higher monochromatic value leads to a determination that the image has higher output suitability under the set condition. On the contrary, lower monochromatic value leads to a determination that the image has lower output suitability under the set condition. The monochromatic value will hereinafter be described in detail.

Here, the monochromatic value is set as an integration of analysis results of brightness distribution, saturation distribution, and landscape images. Analytical methods and scores for the respective items will hereinafter be described in detail. It will be appreciated that analytical items are not restricted to those above, but hue distribution and contrast intensity may also be included. Further, the above-exemplified items each or a combination thereof or that of other items may be a separate analytical item. That is, the image selecting condition can be made to analyze at least one of brightness distribution, saturation distribution, landscape images, hue distribution, and contrast intensity.

It is noted that what is important in the present embodiment is that the selecting condition setting unit 102 determines an image selecting condition based on the output color in printing set in the output setting unit 101. That is, if the setting is colored output (particularly colored output), the image selecting condition is determined to select an image suitable for color (particular color) printing. On the other hand, if the setting is monochromatic output, the image selecting condition is determined to select an image suitable for monochrome printing.

Assuming that the image selecting condition is preset in relation to each output color, and if the setting is monochromatic output, the image selecting condition in the present embodiment is a comparison based on a monochromatic value (monochromatic score) as mentioned above, that is, an integration of analysis results of brightness distribution, saturation distribution, and landscape images. Therefore, in the present embodiment, the selecting condition setting unit 102, if it determines that the output color set in the output setting unit 101 is monochrome, can set an image selecting condition according to the determination.

It is noted that the image selecting condition for each output color may be preset or may be input by a user via the input operation units in every image selection.

First will be described a method of analyzing brightness distribution. Images with wider dynamic range are generally suitable for monochromatic output. Hence, a brightness distribution analyzing unit 703 shown in FIG. 7 analyzes brightness distribution by determining the width of the histogram of each image. The brightness distribution analyzing unit 703 determines that images with a wider histogram range have a wider dynamic range and sets a higher monochromatic value. It will be appreciated that brightness distribution may be analyzed by other analytical methods.

Figure 3A:
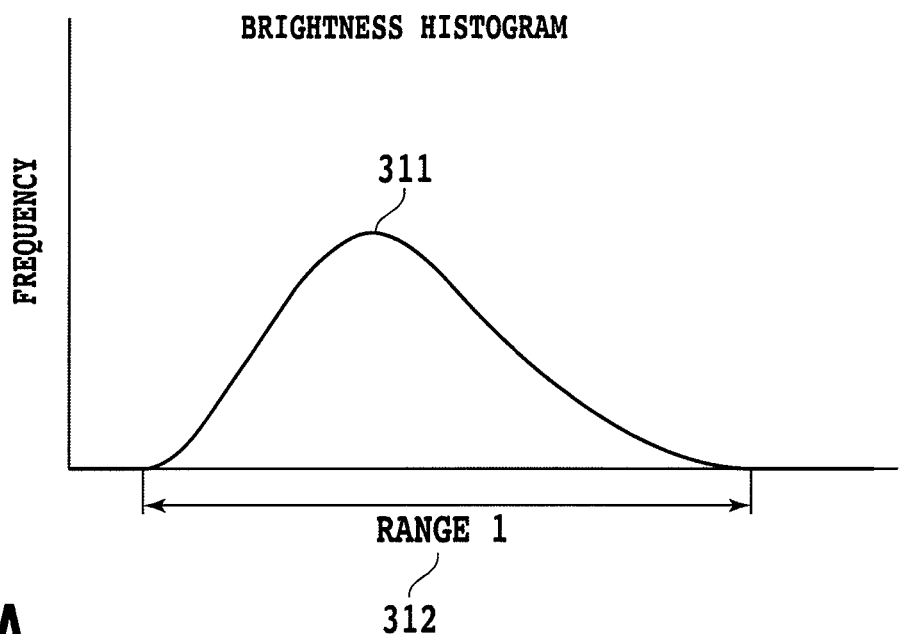
FIG. 3A is a view that illustrates a brightness histogram range according to the embodiment of the present invention.
Figure 3B:
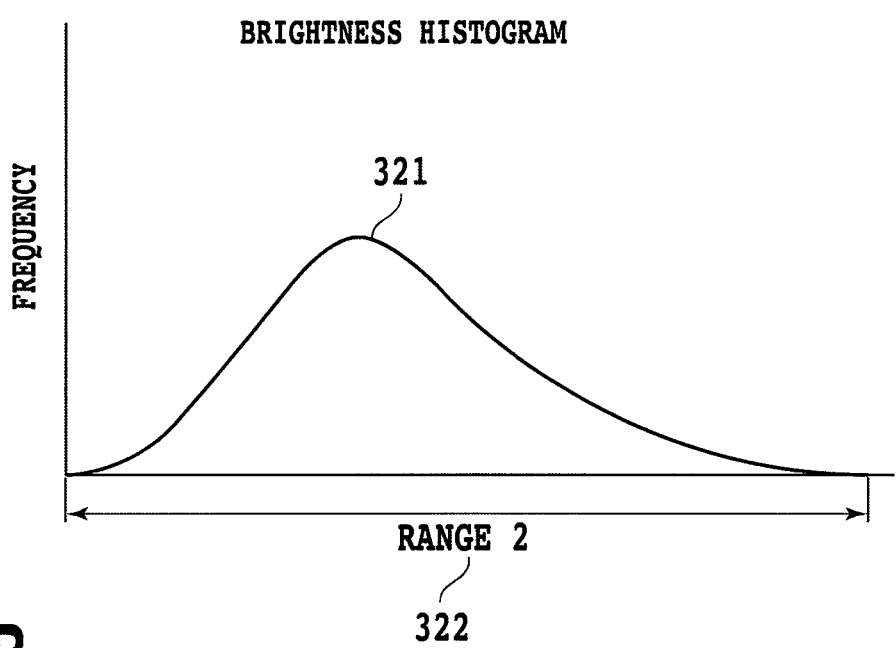
FIG. 3B is a view that illustrates a brightness histogram range according to the embodiment of the present invention.

FIGS. 3A and 3B show overall brightness histograms of images. For example, the histograms of different images are denoted by the respective reference numerals 311 and 321. "Range 1" and "Range 2" denote the width of the respective histograms. The histogram 321 is wider than the histogram 311. That is, the image of the histogram 321 has a wider dynamic range and is thus suitable for monochromatic output.

In the present embodiment, since the brightness range is assumed to be 0 to 255, the monochromatic value (V_l) determined based on an analysis result of brightness distribution is set by the following evaluation formula:

$$V\_l = Range/256,\text{ where "Range" is the histogram range of the evaluated image.}$$

The brightness distribution analyzing unit 703 can thus calculate a brightness distribution-related monochromatic value (V_l) based on an analysts result of brightness distribution.

Next, a method of analyzing saturation distribution will be described. Images with higher saturation are generally more suitable for colored output than for monochromatic output. Hence, a saturation distribution analyzing unit 704 shown in FIG. 7 calculates the ratio of higher saturation in each image to determine that images with higher ratios are less suitable for monochromatic output and sets a lower monochromatic score.

Here, the width of an input image is represented by W [pixel], and the height of that is represented by H [pixel]. A high saturation determination criterion here is set that the ratio of the number of pixels with saturation equal to or higher than a predetermined threshold to the number of pixels W×H is 70% or more. It will be appreciated that this criterion is not restricted to 70%, but may be a desired ratio appropriately. Also, the predetermined threshold may be predetermined subjectively based on multiple sample images or may be set by an operator who makes an output setting by a setting unit not shown in the drawings.

The saturation distribution analyzing unit 704 performs higher saturation determination processing for each pixel in the image area and counts the number of pixels (N_s) that are determined to have higher saturation, and then calculates the ratio of the number of pixels of higher saturation to the whole number of pixels as a monochromatic value (V_s) determined based on an analysis result of saturation distribution. V_s is set by the following evaluation formula:

$$V\_s = N\_s/(W \times H).$$

The saturation distribution analyzing unit 704 can thus calculate a saturation distribution-related monochromatic value (V_s) based on an analysis result of saturation distribution. It will be appreciated that saturation distribution may be analyzed by other analytical methods.

Next, a method of analyzing landscape images will be described. Generally, scenic images including buildings are suitable for cold-tone monochromatic output, while portrait images are suitable for warm-tone monochromatic output. Hence, a landscape images analyzing unit 705 shown in FIG. 7 sets a monochromatic value based on landscape images information contained in imaging information (e.g. Exchangeable Image File Format) attached to the image file or object recognition.

Herein, face detection as an example of object recognition will be described. Face detection uses a heretofore known technique. It will be appreciated that other objects may be recognized to set a score.

In the present embodiment, since the setting is warm-tone monochromatic output, the landscape images analyzing unit 705 sets a higher monochromatic value for portrait images and determines that images including larger faces are more suitable for warm-tone monochromatic output.

The landscape images analyzing unit 705 performs face detection processing for each image. The detection result is a rectangular area with the width W_f and height H_f. Herein, for the sake of descriptive convenience, it is assumed W_f=H_f. The monochromatic value (V_f) determined based on an analysis result of landscape images is set by the following evaluation formula:

$$V\_f = W\_f/\min(W,H),\text{ where }\min(W,H)\text{ is an operation that outputs the smaller of }W\text{ and }H.$$

In accordance with this formula, the landscape images analyzing unit 705 calculates the ratio of the detected face size to the shorter side of the image as a landscape images related monochromatic value (V_f). It will be appreciated that landscape images may be analyzed by other analytical methods.

That is, the landscape images analyzing unit 705 can detect and analyze a subject (e.g. face) in each image and, based on the analysis result, obtain a monochromatic score for image selection.

A score integrating unit 706 shown in FIG. 7 integrates the foregoing three monochromatic values (monochromatic scores) to calculate a final monochromatic value. The integrated monochromatic value (V) is set by the following evaluation formula:

$$V = V\_l - V\_s + V\_f.$$

It can be determined that the higher the score is, the more suitable for warm-tone monochromatic output.

The reference numeral 103 denotes a selection DB specifying unit. The selection DB specifying unit 103 can specify a group of images for image selection. A method for selection DB specification will be described in detail with reference to FIG. 4.

Figure 4:
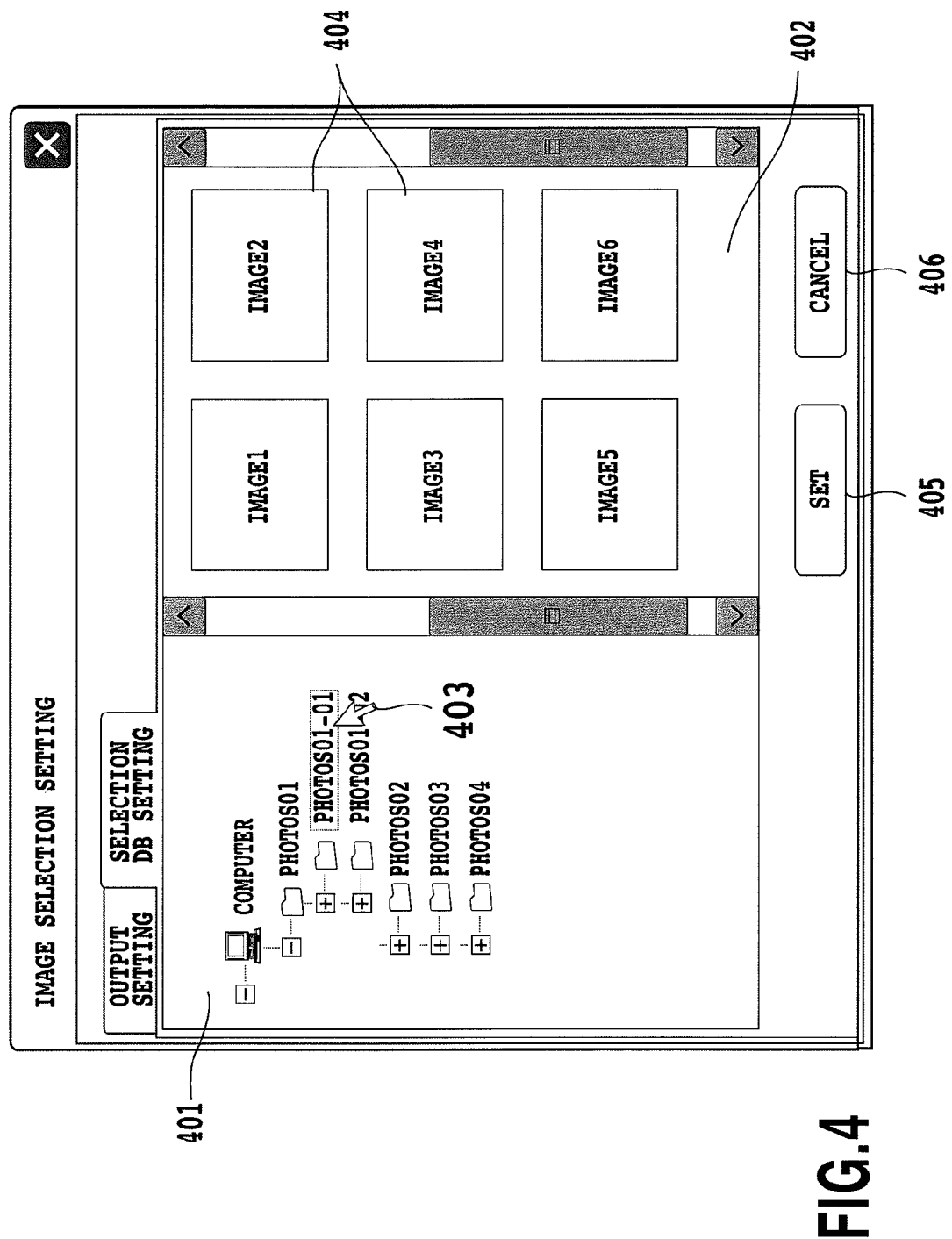
FIG. 4 is a view that illustrates a DB specifying method for selection image search according to the embodiment of the present invention.

FIG. 4 is a UI for selection DB specification to be displayed on the displaying unit.

The reference numeral 401 denotes a hierarchical folders displaying window in which the folder configuration in the used computer is displayed.

The reference numeral 402 denotes an in-folder images displaying window.

The reference numeral 403 denotes a mouse cursor. When a user moves the mouse cursor via the input operation units to select a folder, images in the selected folder are displayed in the in-folder images displaying window.

The reference numeral 404 denotes images in the selected folder.

The reference numeral 405 denotes a selection DB setting completion button. A DB as a group of images for image selection is specified using the mouse cursor 403 and set by pressing this button.

The reference numeral 406 denotes a selection DB setting cancellation button. The specified DB for image selection is cancelled by pressing this button.

In the present embodiment, when a user thus selects a desired group of images (DB) in the image selection DB setting tab 203 via the input operation units, the selection DB specifying unit 103 receives the selection as an input to thereafter specify a group of images for image selection.

The reference numeral 104 denotes an image selecting unit. Based on the image selecting condition set in the selecting condition setting unit 102, the image selecting unit 104 selects and extracts images that satisfy the condition from all the images in the DB specified in the selection DB specifying unit 103. In the present embodiment, since the setting is warm-tone monochromatic output, the image selecting unit 104 calculates a warm-tone monochromatic value set in the selecting condition setting unit 102 for each of all the images in the DB. The warm-tone monochromatic value calculation processing for each image will be described with reference to FIG. 7.

FIG. 7 is a block diagram of an apparatus configured to calculate a monochromatic value for each image contained in a group of images for image selection.

The reference numeral 701 denotes an image input unit. The image input unit 701 reads images to calculate a warm-tone monochromatic value from the DB (group of images) specified in the selection DB specifying unit 103. The color space of input images is here assumed to be RGB space.

The reference numeral 702 denotes an image color converting unit. The image color converting unit 702 converts the color space of images input by the image input unit 701. Here, input images in the RGB space are converted into the HSB space (or HSV space, where H, S, B, and V mean, respectively, Hue, Saturation, Brightness, and Value) and the YCC space (e.g. sYCC, xvYCC).

The reference numeral 703 denotes a brightness distribution analyzing unit. The brightness distribution analyzing unit 703 analyzes brightness distribution in images after being converted into the YCC space. The method of analyzing brightness distribution is as mentioned above, and the description thereof will be omitted.

The reference numeral 704 denotes a saturation distribution analyzing unit. The saturation distribution analyzing unit 704 analyzes saturation distribution in images after being converted into the HSB space. The method of analyzing saturation distribution is as mentioned above, and the description thereof will be omitted.

The reference numeral 705 denotes a landscape images analyzing unit. The landscape images analyzing unit 705 analyzes the landscape images of images input by the image input unit 701. The method of analyzing landscape images is as mentioned above, and the description thereof will be omitted.

The reference numeral 706 denotes a score integrating unit. The score integrating unit 706 integrates a monochromatic value (V_l) calculated in the brightness distribution analyzing unit 703, a monochromatic value (V_s) calculated in the saturation distribution analyzing unit 704, and a monochromatic value (V_f) calculated in the landscape images analyzing unit 705. The method of integration is as mentioned above, and the description thereof will be omitted here.

In the image selecting unit 104, all the images in the specified DB undergo the processing shown in FIG. 7 and the images are sorted in descending order of warm-tone monochromatic value.

The reference numeral 105 denotes a selection result displaying unit. Based on the evaluation result in the image selecting unit 104, images with higher warm-tone monochromatic value are displayed in a UI on the displaying unit. Then a user selects images to be output from the displayed images via the input operation units. This will be described in detail with reference to FIG. 5.

Figure 5:
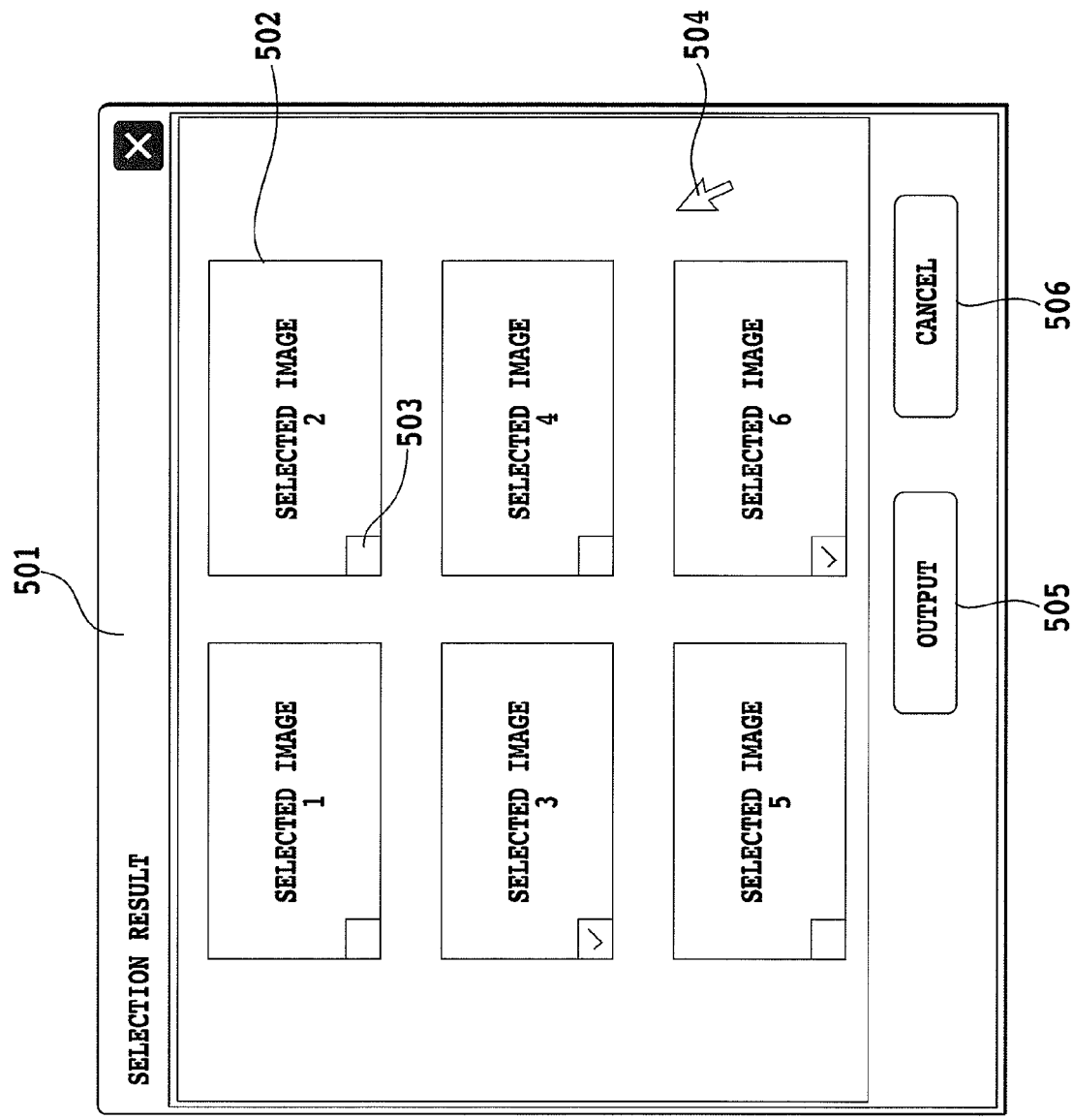
FIG. 5 is a view that illustrates displaying of selected images according to the embodiment of the present invention.

FIG. 5 is a display example on the selection result displaying unit. After being processed in the image selecting unit 104, images with higher warm-tone monochromatic values are displayed in a UI.

The reference numeral 501 denotes a selection result displaying window.

The reference numeral 502 denotes selected images displayed in descending order of the calculated warm-tone monochromatic value. Herein, for the sake of descriptive convenience, the top six images in the warm-tone monochromatic value are displayed. It will be appreciated that the number of images to be displayed is not restricted to six. For example, if the number of images to be displayed is set to one, the image most suitable for monochromatic output can be selected automatically without imposing a burden on the user. Alternatively, if the number of images to be displayed is set greater, a large number of images suitable for the output color in printing can be extracted automatically. Accordingly, in the case of making a photo-book, in which layout and design are important factors, a large number of images with high-quality layouts and designs can be provided. This allows the user to acquire a large number of images as candidates for the photo-book, exhibiting an improved user-friendliness.

The reference numeral 503 denotes checkboxes. Users can select output images from the multiple selected and displayed images via the input operation units by checking the corresponding checkboxes.

The reference numeral 504 denotes a mouse cursor. The mouse cursor 504 is used to check the checkboxes.

The reference numeral 505 denotes an output button. Checked images are output by pressing this button.

The reference numeral 506 denotes a cancellation button. If there is no image contained in the selected images that the user wants to output, the user presses the cancellation button.

Contrast and Exif tag scene information, tag information attached to images, may also be utilized additionally as monochromatic image selecting conditions. If the image selecting condition is to analyze tag information attached to images, the image selecting unit 104 should analyze tag information attached to images and select images based on the analysis result.

Given that, for example, scenic images generally have a higher cold-tone monochromatic value as mentioned above, if the Exif tag indicates a scenic mode as a photography mode, it is determined that the image has a high cold-tone monochromatic value. Night scene images, also included in scenic images, are wholly dark to result in poor brilliance and show high brightness dispersion because lighting sites in a night scene have a higher brightness regardless of low general brightness. Based on these characteristics, night scene images may be scored to have a lower cold-tone monochromatic value through the units 703 and 704 in FIG. 7.

Generally, unshaded images with lower contrast are not suitable for monochromatic output. Therefore, the highlight and shadow points may be calculated in the brightness components of the image and it may be determined that the greater the distance between the two points is, the higher contrast the image has to be suitable for monochromatic output.

It will be appreciated that these multiple conditions may be combined for comprehensive image selection. It will also be appreciated that the conditions may be weighted by a user for the users' intended image selection.

Figure 6:
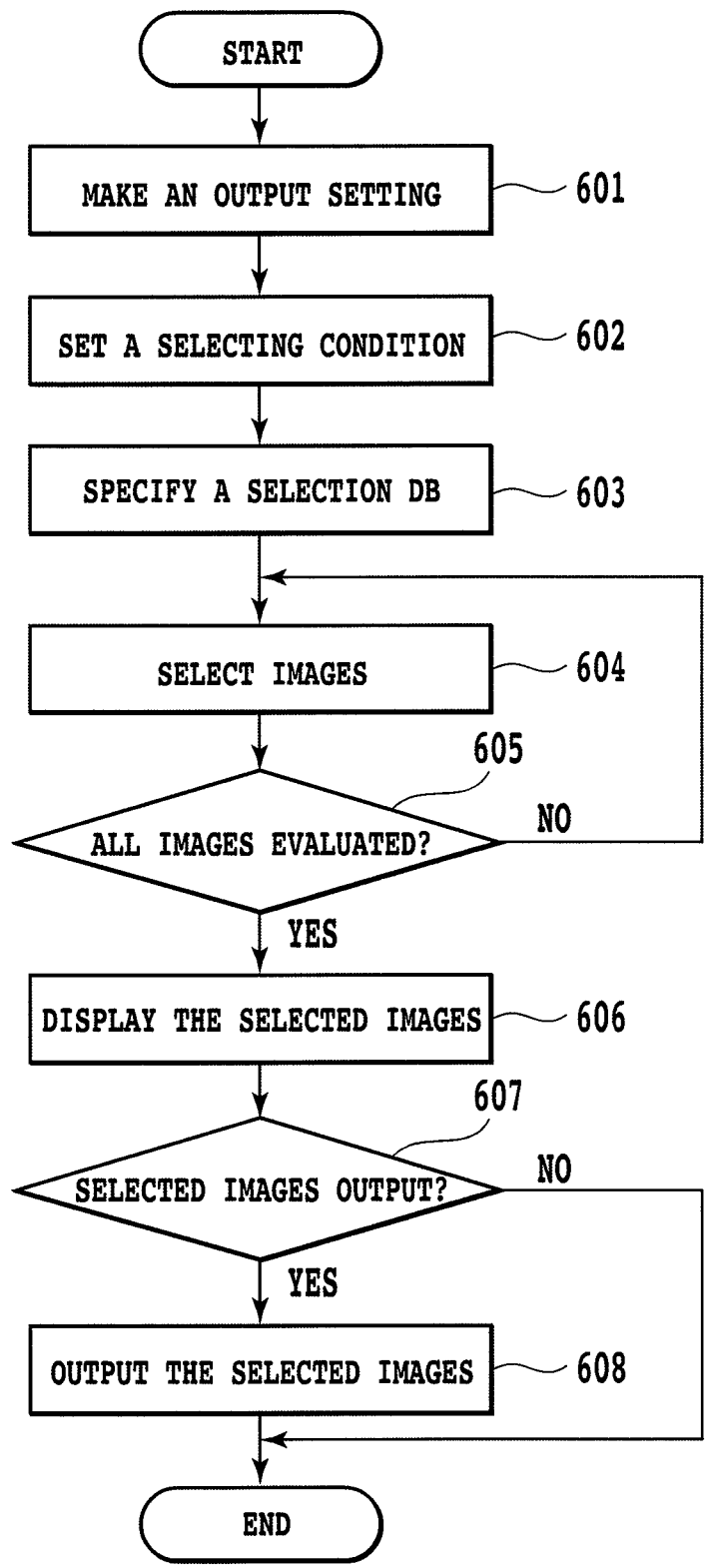
FIG. 6 is a flowchart for image output according to the embodiment of the present invention.

Next, the operation sequence of the above-described image processing apparatus will be described. FIG. 6 is a flowchart of processing performed in the image processing apparatus.

First, the output setting unit 101 acquires an output setting based on a user input via the input operation units (Step 601). The output setting here is warm-tone monochromatic output.

It is noted that if a predetermined default color is preset as output color in printing (e.g. colored output, particularly colored output, monochromatic output), the preset color should be set as output color. That is, in this case, the printing is to be performed not in output color set by a user but in the preset color.

The output color in printing may thus be set by a user or may be preset. What is important of the present embodiment is that an image selecting condition is set depending on predetermined output color and the output color may be set by any method. However, if a user can set output color arbitrarily, images suitable for a user's intended output color can be selected to be printed.

The selecting condition setting unit 102 sets an image selecting condition based on the output color in printing (warm-tone monochromatic) set in the output setting step (Step 602). Two kinds of image selecting conditions are here provided: the image containing a face area; and the width of brightness histogram. It is therefore managed in, for example, a table that the two image selecting conditions are to contain a face area if the setting is warm-tone monochromatic output and to analyze brightness distribution. That is, output color and image selecting conditions suitable for the output color are managed in relation to each other in the table.

Next, the selection DB specifying unit 103 specifies a DB to search for images therein based on a user input via the input operation units (Step 603). Here, a user can specify the DB through a UI displayed on the displaying unit using a pointing device included in the input operation units.

The image selecting unit 104 selects images that satisfy the image selecting conditions set in Step 602 from the DB specified in Step 603 (Step 604). Here, the image selecting unit 104 evaluates the images and obtains scores based on the set image selecting conditions.

The image selecting unit 104 then determines if, for all the images in the DB specified in Step 603, the scores based on the image selecting conditions are obtained (Step 605). If the scores are obtained for all the images in the specified DB, the routine moves to the next processing. Unless scores are obtained for all the images in the specified DB, Steps 604 and 605 are repeated until scores are obtained for all the images.

Figure 8:
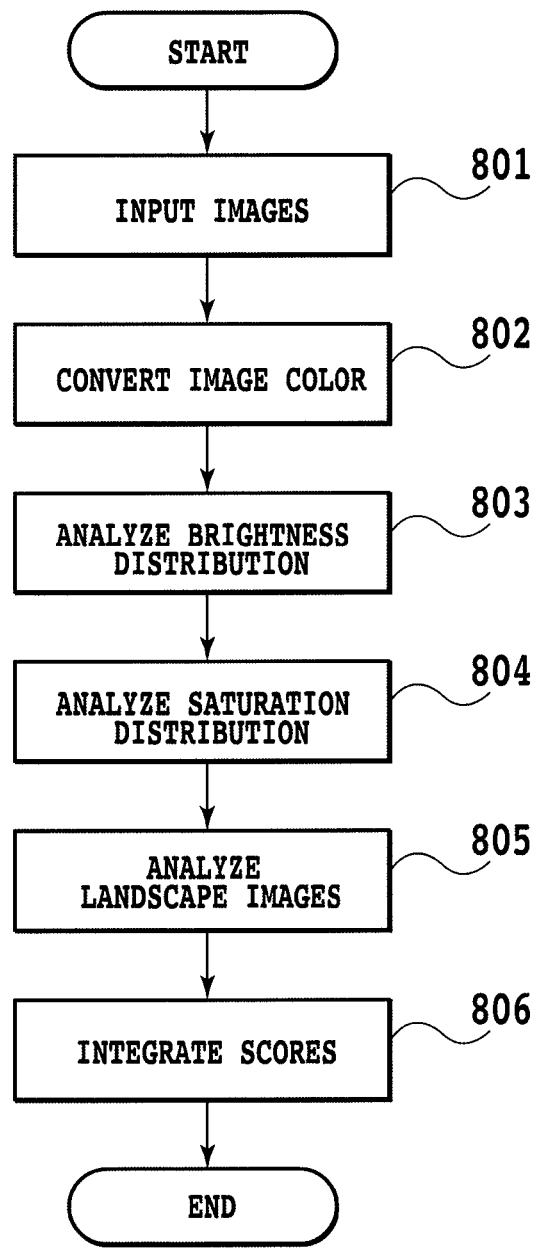
FIG. 8 is a flowchart for image evaluation according to the embodiment of the present invention.

Here will be described the flow of calculating monochromatic scores in detail with reference to FIG. 8.

First, the image input unit 701 reads images to be analyzed from the DB specified in Step 603 (Step 801). Here, RGB images are read as input images.

Next, the image color converting unit 702 converts the color space of the images input in Step 801 (Step 802). Here, the images are converted from the RGB space to the YCC and HSB spaces.

Next, the brightness distribution analyzing unit 703 analyzes the brightness components of the YCC images converted in Step 802 and calculates a monochromatic value $V\_l$ based on the analysis result (Step 803).

Next, the saturation distribution analyzing unit 704 analyzes the saturation components of the HSB images converted in Step 802 and calculates a monochromatic value $V\_s$ based on the analysis result (Step 804).

Next, the landscape images analyzing unit 705 analyzes the landscape images of the input images and calculates a monochromatic value $V\_f$ based on the analysis result (Step 805). It is noted that since the image selecting conditions here include detecting a face area, the landscape images analyzing unit 705 extracts a face area from the input images and analyzes the images based on the extraction result.

Next, the score integrating unit 706 integrates the monochromatic values calculated in the respective analyzing units (Step 806).

A monochromatic score is calculated through this processing flow.

The image selecting unit 104 sorts all the images with scores assigned thereto in descending order of the score. The selection result displaying unit 105 then displays the selected images by any number from the highest score (Step 606).

The image processing apparatus has the user determine if there are any images contained in the displayed selected images that the user wants to output (Step 607).

If there are any images that the user wants to output, the user selects the images via the input operation units and presses the "Output" button. This causes the output unit 106 to output (print) the images under the set output conditions. On the other hand, if there is no image that the user wants to output, the processing can be stopped by pressing the "Cancel" button.

The image processing apparatus according to the first embodiment has heretofore been described.

In accordance with the present embodiment, since output color from the output unit is taken into account on image selection, images suitable for the user's intended output color can be selected. That is, since image selecting conditions are set depending on output color in printing and images are selected based on the image selecting conditions, images suitable for the output color can be selected.

In addition, the image selecting conditions set depending on the output color can automatically determine if the images converted into the output color are suitable for output. Therefore, images suitable for the output color can be selected automatically from even a large number of images. Further, since the determining conditions are set automatically, even less-experienced users can select images suitable for the output color. In the case where layout including output color is an important factor, e.g., in the case of photo-books, user's intended images can be selected easily by utilizing the present embodiment, exhibiting an improved user-friendliness.

It is noted that the image processing apparatus according to the present embodiment may be an information processing apparatus such as a personal computer (PC). In this case, an output unit 106 such as a printer or a multifunction device should be connected to the PC or the like via a network. The image processing apparatus may also be an image forming apparatus itself such as a printer or a multifunction device or, alternatively, may be a cell-phone or a photo-viewer (Digital photo frame) having a photo-viewer function for viewing digital images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2008-238299, filed Sep. 17, 2008, which is hereby incorporated by reference herein in its entirety.

What is claimed is:

1. An image processing apparatus comprising:
a specifying unit configured to specify a group of images for image selection;
a selecting unit configured to, in a case where monochromatic output is set, select an image for performing monochromatic output from the specified group of images based on a result obtained by determining a width of a histogram of brightness of each image included in the specified group of images; and
a monochromatic output unit configured to output the selected image as a monochromatic output,
wherein the selecting unit selects preferentially an image whose histogram of brightness has a width that is wider than that of the other images in the group of images.

2. The image processing apparatus according to claim 1, wherein the selecting unit selects an image for performing monochromatic output further based on tag information attached to the image, the tag information including image landscape mode on capturing the image.

3. The image processing apparatus according to claim 1, further comprising a displaying unit configured to display the result of the image selection.

4. The image processing apparatus according to claim 1, wherein
the selecting unit selects an image for performing monochromatic output further based on a result of analysis of at least one of hue distribution, saturation distribution, and contrast intensity in the image included in the group of images.

5. The image processing apparatus according to claim 1, further comprising a detecting unit configured to detect a subject in the image included in the group of images, wherein
the selecting unit is further configured to select an image based on the result of the subject detection.

6. An image processing method executed by an image processing apparatus, comprising:
a specifying step of specifying a group of images for image selection;
a selecting step of, in a case where monochromatic output is set, selecting an image for performing monochromatic output from the specified group of images based on a result obtained by determining a width of a histogram of brightness of each image included in the specified group of images; and
an outputting step of outputting the selected image as a monochromatic output,
wherein the selecting step selects preferentially an image whose histogram of brightness has a width that is wider than that of the other images in the group of images.

7. The image processing method according to claim 6, wherein the selecting step selects an image for performing monochromatic output further based on tag information attached to the image, the tag information including image landscape mode on capturing the image.

8. The image processing method according to claim 6, further including comprising a displaying step of displaying the result of the image selection.

9. The image processing method according to claim 6, wherein
the selecting step selects an image for performing monochromatic output further based on a result of analysis of at least one of hue distribution, saturation distribution, and contrast intensity in the image included in the group of images.

10. The image processing method according to claim 6, further comprising a detecting step of detecting a subject in the image included in the group of images, wherein
the selecting step selects an image based on the result of the subject detection.

11. A non-transitory computer readable storage medium storing computer executable code of a computer-readable program for implementing the image processing method according to claim 6.

12. The image processing apparatus according to claim 4, wherein the selecting unit selects preferentially an image whose saturation is lower than that of the other images in the group of the images.

13. The image processing method according to claim 9, wherein the selecting step selects preferentially an image whose saturation is lower than that of the other images in the group of the images.

14. The image processing apparatus according to claim 1, wherein a user interface displays at least one image of the group of images in descending order of warm-tone monochromatic value.

15. The image processing method according to claim 6, wherein a user interface displays at least one image of the group of images in descending order of warm-tone monochromatic value.

* * * * *